US006734253B2

(12) United States Patent
Krabbenborg et al.

(10) Patent No.: US 6,734,253 B2
(45) Date of Patent: May 11, 2004

(54) SCRATCH AND MAR RESISTANT PROPYLENE POLYMER COMPOSITION

(75) Inventors: Franciscus J. T. Krabbenborg, Terneuzen (NL); Neldes J. Hovestad, Sint Jansteen (NL)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/199,531

(22) Filed: Jul. 19, 2002

(65) Prior Publication Data

US 2004/0014891 A1 Jan. 22, 2004

(51) Int. Cl.$^7$ ............... C08L 23/00; C08L 23/04; C08K 3/20
(52) U.S. Cl. ............... 525/191; 525/240; 524/451
(58) Field of Search ............... 525/191, 240; 524/451

(56) References Cited

U.S. PATENT DOCUMENTS

| 3,336,268 A | 8/1967 | Cox |
| 3,424,703 A | 1/1969 | Jones, Jr. |
| 3,645,992 A | 2/1972 | Elston |
| 3,893,989 A | 7/1975 | Leicht et al. |
| 4,113,802 A | 9/1978 | Matteoli et al. |
| 4,701,432 A | 10/1987 | Welborn, Jr. |
| 4,935,397 A | 6/1990 | Chang |
| 4,937,299 A | 6/1990 | Ewen et al. |
| 4,937,301 A | 6/1990 | Chang |
| 5,055,438 A | 10/1991 | Canich |
| 5,091,461 A | 2/1992 | Skochdopole |
| 5,391,618 A | 2/1995 | Yamamoto et al. |
| 5,414,027 A | 5/1995 | DeNicola, Jr. et al. |
| 5,576,374 A | 11/1996 | Betso et al. |
| 5,639,829 A | 6/1997 | Yamaguchi et al. |
| 6,300,419 B1 | 10/2001 | Sehanobish et al. |
| 6,329,454 B1 | 12/2001 | Krabbenborg |
| 6,359,073 B1 * | 3/2002 | Babb et al. ................. 525/194 |
| 6,403,692 B1 | 6/2002 | Traugott et al. |
| 6,472,473 B1 * | 10/2002 | Ansems et al. ............. 525/191 |
| 6,521,306 B1 * | 2/2003 | Hoenig et al. ............. 428/36.8 |
| 6,528,136 B1 * | 3/2003 | Ho et al. ................... 428/36.8 |

FOREIGN PATENT DOCUMENTS

| EP | 260999 | 3/1988 |
| EP | 129368 | 7/1989 |
| EP | 639613 | 2/1995 |
| EP | 391413 | 12/1996 |
| WO | WO90/07526 | 7/1990 |
| WO | WO 99/10415 | 3/1999 |
| WO | WO 99/10424 | 3/1999 |
| WO | WO 99/28381 | 6/1999 |
| WO | WO 00/78858 A2 | 12/2000 |

OTHER PUBLICATIONS

Journal of Applied Polymer Science, vol. 61, 1395–1404 (1996).
Modem Plastics Encyclopedia/89, mid Oct. 1988 Issue, vol. 65, No. 11, pp. 86–92.

* cited by examiner

Primary Examiner—Nathan M. Nutter

(57) ABSTRACT

Disclosed are injection molded automotive articles comprising a coupled propylene polymer composition and optionally a thermoplastic elastomer, a thermoplastic polymer and a filler.

16 Claims, No Drawings

SCRATCH AND MAR RESISTANT PROPYLENE POLYMER COMPOSITION

FIELD OF THE INVENTION

This invention relates to a coupled propylene polymer composition and fabricated articles thereof.

BACKGROUND OF THE INVENTION

Polypropylene has been used in many applications in the form of molded articles, film, sheet, etc., because it is excellent in molding processability, toughness, moisture resistance, gasoline resistance, chemical resistance, has a low specific gravity, and is inexpensive. The use of polypropylene polymers is expanding at an increasing rate in the fields of exterior and interior automotive trims, in electrical and electrical equipment device housing and covers as well as other household and personal articles.

However, many automotive applications require fabricated articles with greater heat resistance, impact resistance, stiffness and/or, especially for unpainted applications, scratch and mar resistance than conventional polypropylenes can provide. These deficiencies are obstacles to opening up new applications for polypropylene, particularly applications which have traditionally been injection molded.

Attempts to provide improved propylene polymer compositions include the use of a high crystalline propylene polymer, see U.S. Pat. No. 6,300,419, a unique metallocene catalyzed interpolymer and slip agent combination, see U.S. Pat. No. 6,329,454, or a unique combination of calcined and uncalcined tillers, see U.S. Pat. No. 6,403,692.

In order to improve performance, especially impact resistance, polypropylene has been blended with a rubbery elastic material such as ethylene-propylene copolymer rubber, ethylene-propylene-diene copolymer rubber or ethylenebutene copolymer rubber. For examples, see U.S. Pat. No. 5,391,618 which discloses low crystalline polypropylene polymer compositions comprising an ethylene alpha-oletin copolymer, U.S. Pat. No. 5,576,374 which discloses propylene polymer compositions comprising a substantially linear ethylene polymer and U.S. Pat. No. 5,639,829 which discloses propylene polymer compositions comprising an ethylene and 1-butene random copolymer.

Attempts to modify the toughness of propylene polymers also include cross-linking or branching induced by non-selective chemistries involving free radicals using peroxides or high energy radiation. For the reaction of polypropylene with peroxides see Journal of Applied Polymer Science, Vol. 61, 1396–1404 (1996). However, this approach does not work well in actual practice as the rate of chain scission tends to dominate the limited amount of chain coupling that takes place. For radiation of polypropylene to produce long branches for producing polypropylene film see U.S. Pat. No. 5,414,027. Another method to improve melt strength of propylene polymers is taught in U.S. Pat. No. 3,336,268 wherein polypropylene is bridged with sulfonamide groups. However, while impact properties are improved, these propylene polymer compositions do not achieve a good balance of stiffness, toughness, and scratch and mar resistance.

It would be highly desirable to provide injection molded articles comprising a propylene polymer composition which exhibits a good balance of stiffness, toughness and scratch and mar resistance.

SUMMARY OF THE INVENTION

The present invention is a process for preparing an injection molding automotive article from a coupled propylene polymer composition comprising the steps of (i) preparing a coupled propylene polymer composition comprising (a) a propylene polymer formed by a reaction of from about 0.01 to about 1 weight percent of a poly(sultonyl azide) with a propylene polymer, wherein weight percent is based on the weight of the propylene polymer, and optionally one or more of (b) a polyolefin elastomer, (c) a thermoplastic polymer, (d) a filler or (e) a slip agent and (ii) injection molding an automotive article.

Another embodiment of the present invention is an injection molded automotive article comprising a coupled propylene polymer composition comprising a coupled propylene polymer formed by a reaction of from about 0.01 to about 1 weight percent of a poly(sulfonyl azide) with a propylene polymer and optionally one or more of a polyolefin elastomer, a thermoplastic polymer, a filler or a slip agent, weight percent based on the weight of the propylene polymer.

DETAILED DESCRIPTION OF THE EMBODIMENTS

The injection molded automotive articles of the present invention are produced from a coupled propylene polymer composition. The coupled propylene polymer composition involves coupling of a propylene polymer using a coupling agent The propylene polymer Is a propylene homopolymer, preferably a propylene copolymer or most preferably an impact propylene copolymer.

The propylene polymer suitable for use in this invention is well known in the literature and can be prepared by vanous processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichoride which contains as essential components titanium, magnesium and a halogen; as an organometalic component an organoaluminum compound; and it desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Propylene polymers are commonly made by catalytically reacting propylene in a polymerization reactor with appropriate molecular weight control agents. Nucleating agent is added after the reaction is completed in order to promote crystal formation. The polymerization catalyst should have high activity and be capable of generating highly lactic polymer. The reactor system must be capable of removing the heat of polymerization from the reaction mass, so the temperature and pressure of the reaction can be controlled appropriately.

A good discussion of various polypropylene polymers is contained in Modem Plastics Encyclopedia/89, mid October 1988 Issue, Volume 65, Number 11, pp. 86–92, the entire disclosure of which is incorporated herein by reference. In general, the propylene polymer is in the isotactic form, although other forms can also be used (e.g., syndiotactic or atactic). The propylene polymer used for the present invention is a propylene homopolymer or a propylene copolymer of propylene and an alpha-olefin, preferably a $C_2$, or $C_4$ to $C_{20}$ alpha-olefin, for example, a random or block copolymer or preferably an impact propylene copolymer.

Examples of the $C_2$, and $C_4$ to $C_{20}$ alpha-olefins for constituting the propylene copolymer include ethylene, 1-butene, 1-pentene, 1-hexene, 1-heptene, 1-octene, 1-decene, 1-dodecene, 1-hexadecene 4-methyl-1-pentene, 2-methyl-1-butene, 3-methyl-1-butene, 3,3dimethyl-1-butene, diethyl-1-butene, trimethyl-1-butene, 3-methyl-1-pentene, ethyl-1-pentene, propyl-1pentene, dimethyl-1-pentene, methylethyl-1-pentene, diethy-1-hexene, trimethyl-1 pentene, 3-methyl-1-hexene, dimethyl-1-hexene, 3,5,5trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified It Is generally on position 3 or higher of the alkene.

For random or block propylene copolymers, the alpha-olefin is present in an amount of not more than 15 weight percent, preferably not more than 12 weight percent, even more preferably not more than 9 weight percent and most preferably not more than 7 weight percent Impact propylene copolymers are commercially available and are well known within the skill in the art for instance, as described by E. P. Moore, Jr in *Polvoropylene Handbook*, Hanser Publishers, 1996, page 220–221 and U.S. Pat. Nos. 3,893,989 and 4,113,802. The term "impact propylene copolymer" is used herein to refer to heterophasic propylene copolymers where polypropylene is the continuous phase and an elastomeric phase is dispersed therein. Those of skill in the art recognize that this elastomeric phase may also contain crystalline regions, which for purposes of the current invention are considered part of the elastomeric phase. The impact propylene copolymer may be polypropylene and an elastomer physically blended, preferably the impact propylene copolymers result from an in-reactor process. Usually the impact propylene copolymers are formed in a dual or multi-stage process, which optionally involves a single reactor with at least two process stages taking place therein, or optionally multiple reactors.

The continuous phase of the impact propylene copolymer typically will be a propylene homopolymer or a random propylene copolymer, more typically a propylene homopolymer. The continuous phase of the impact propylene copolymer may be made using Ziegler-Natta catalyst, constrained geometry catalyst, metallocene catalyst, or any other suitable catalyst system. When the propylene polymer making up the continuous phase is a propylene homopolymer, the crystallinity of the propylene polymer, as determined by differential scanning calorimetry, is preferably equal to or greater than about 50 percent, more preferably equal to or greater than about 55 percent, most preferably equal to or greater than about 62 percent. The methods for determining percent crystallinity using a differential scanning calorimetry are known to one skilled in the art.

The elastomeric phase comprises propylene and one or more alpha olefins, preferably ethylene. The elastomeric phase may be made using constrained geometry catalyst, Ziegler-Natta catalyst, metallocene catalyst, or any other suitable catalyst.

When the continuous phase of the impact propylene copolymer is a propylene homopolymer and the elastomeric phase is comprised of a copolymer or terpolymer containing monomer units derived from ethylene, the impact propylene copolymer preferably contains an amount equal to or greater than about 5 weight percent, more preferably equal to or greater than about 7 weight percent, most preferably equal to or greater than about 9 weight percent —$CH_2CH_2$— units derived from ethylene monomer based on the total weight of the impact propylene copolymer. Preferably, such an impact propylene copolymer contains less than about 30 weight percent, more preferably less than about 25 weight percent, most preferably less than about 20 weight percent —$CH_2CH_2$units derived from ethylene monomer based on the total weight of the impact propylene copolymer.

Advantageously, the impact propylene copolymers used for the invention have an elastomeric phase in an amount equal to or greater than about 10 weight percent, preferably equal to or greater than about 15 weight percent, more preferably equal to or greater than about 20 weight percent based on the total weight of the impact propylene copolymer. Preferably, the elastomeric phase is less or equal to about 70 weight percent, more preferably less than or equal to about 40 weight percent, most preferably less than or equal to about 25 weight percent based on the total weight of the impact propylene copolymer.

The propylene polymer is employed in amounts equal to or greater than about 30 parts by weight, preferably equal to or greater then about 40 parts by weight, more preferably equal to or greater than about 50 parts by weight, even more preferably equal to or greater than about 60 parts by weight and most preferably equal to or greater than about 70 parts by weight based on the weight of the coupled propylene polymer composition. In general, the propylene polymer is used in amounts less than or equal to about 100 parts by weight, preferably less than or equal to about 95 parts by weight, more preferably less than or equal to about 90 parts by weight, even more preferably less than or equal to about 85 parts by weight and most preferably 80 parts by weight based on the weight of the coupled propylene polymer composition.

For the purpose of coupling, the propylene polymer is reacted with a polyfunctional compound which is capable of insertion reactions into carbonhydrogen bonds. Compounds having at least two functional groups capable of insertion into the carbonhydrogen bonds of CH, $CH_2$, or $CH_3$ groups, both aliphatic and aromatic, of a polymer chain are referred to herein as coupling agents. Those skilled in the art are familiar with carbonhydrogen insertion reactions and functional groups capable of such reactions, for instance carbenes and nitrenes. Examples of chemical compounds that contain a reactive group capable of forming a carbene group include, for example, diazo alkanes, geminally-substituted methylene groups, and metalbocarbenes. Examples of chemical compounds that contain reactive groups capable of forming nitrene groups, include, but are not limited to, for example, alkyl and aryl azides (R—$N_3$), acyl azides (R—C(O)$N_3$), azidoformates (R—O—C(O)—$N_3$), sulfonyl azides (R—$SO_2$—$N_3$), phosphoryl azides ((RO)$^2$—(PO)—$N_3$), phosphinic azides ($R_2$—P(O)—$N_3$) and silyl azides ($R_3$—Si—$N_3$. It may be necessary to activate a coupling agent with heat, sonic energy, radiation or other chemical activating energy, for the coupling agent to be effective for coupling propylene polymer chains.

The preferred coupling agent is a poly(sulfonyl azide), more preferably a bis(sulfonyl azide). Examples of poly(sulfonyl azides) useful for the invention are described in WO 99/10424. Poly(sulfonyl)azides include such compounds as 1, 5-pentane bis(sulfonyl azide), 1,8-octane bis(sulfonyl azide), 1,10-decane bis(sulfonyl azide), 1,10-octadecane bis(sulfonyl azide), 1—octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred poly(sulfonyl azide)s include 4, 4' oxy-bis-(sulfonylazido)benzene, 2,7-naphthalene bis(sulfonyl azido), 4,4'-bis(sulfonyl azido) biphenyl, 4,4'-diphenyl ether bis(sulfonyl azide) (BSA) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

One skilled in the art knows that an effective amount of coupling agent is dependent on the coupling agent selected and the average molecular weight of the propylene polymer. Typically, the lower the molecular weight of the propylene polymer, the more coupling agent needed. An effective amount of coupling agent is an amount sufficient to result in an adequate combination of mechanical, thermal and physical properties and scratch and mar resistance, but less than a cross-linking amount, that is an amount sufficient to result in less than about 10 weight percent gel in the coupled propylene polymer as measured by ASTM D2765-procedure A. When a poly(sulfonyl azide) is used as a coupling agent, generally, an effective amount is equal to or greater than about 0.01 weight percent, preferably equal to or greater than about 0.05 weight percent, more preferably equal to or greater than about 0.1 weight percent, even more preferably equal to or greater than about 0.15 weight percent and most preferably equal to or greater than about 0.2 weight percent based on the weight of the propylene polymer. Formation of cross-linked propylene polymer is lo be avoided, therefore the amount of bis (sulfonyl azide) is limited to equal to or less than about 1 weight percent, preferably equal to or less than about 0.8 weight percent, more preferably equal to or less than about 0.6 weight percent and most preferably equal to or less than about 0.4 weight percent based on the weight of the propylene polymer.

For coupling, the propylene polymer admixture is exposed to a temperature, hereinafter, melt process temperature, sufficient to result in coupling of the propylene polymer forming a molten coupled propylene polymer composition. Preferably, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide) begins to react at a kinetically significant rate (convenient for use in the practice of the invention) at temperatures of about 130° C. and is almost completely reacted at about 160° C. in a DSC (scanning at 10° C./min). Accelerating rate calorimetry (ARC) (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the melt processing temperature is advantageously greater than about 80° C., preferably greater than about 130° C., more preferably greater than about 150° C., even more preferably greater than about 160° C., even more preferably greater than about 180° C., even more preferably greater than about 200° C. and most preferably greater than about 220° C. Similarly, the coupling temperature is preferably less than about 285° C., more preferably less than about 275° C. most preferably lees than about 255° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. Conveniently the propylene polymer and poly(sulfonyl azide) are processed for at least about 5 seconds, more preferably at least about 15 seconds, most preferably at least about 30 seconds, but preferably less than about 2 hours, more preferably less than about 30 minutes most preferably less than about 15 minutes. In the case of a bis(sulfonyl azide), for instance, the reaction time is preferably equal to or greater than about 1 minute at 200 ° C.

Preferred processes include at least one of (a) dry blending the coupling agent with a polymer, preferably a propylene polymer, and optionally additional components, such as stabilizers, preferably to form a substantially uniform admixture and adding this mixture to melt processing equipment, e.g. an injection molding machine to achieve the coupling reaction, at a temperature of at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer (e.g., the same or different propylene polymer as to which the coupling agent is being added or any of the other thermoplastic polymer mentioned hereinabove) and a coupling agent, advantageously at a temperature less than about the decomposition temperature of the coupling agent, preferably by melt blending, and then forming a second admixture of the first admixture with the propylene polymer (for example a concentrate of a coupling agent admixed with at least one polymer and optionally other additives, is conveniently admixed into the propylene polymer or combination thereof optionally with other additives, to modify the propylene polymer); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (a) and (c) are preferred.

Process (c) is conveniently used to make a concentrate with a first polymer composition having a lower melting temperature, advantageously at a temperature below the decomposition temperature of the coupling agent, and the concentrate is melt blended into the propylene polymer or combination thereof optionally with other additives having a higher melting temperature to complete the coupling reaction. For example, a preferred concentrate for use in the process of the present invention is a melt blended mixture of 4,4'-diphenyl ether bis(sulfonyl azide) (BSA) and IRGANOX 1010 with a linear propylene homopolymer powder. Preferably, the ratio of BSA:IRGANOX 1010 in the mixture is from 20:80 to 80:20 and the ratio of BSA:IRGANOX 1010 mixture:linear polypropylene is from 1:99 to 99:1. Concentrates are especially preferred when temperatures and/or times are sufficiently high to result in loss of coupling agent by evaporation or decomposition not leading to reaction with the polymer, or other conditions which would result in that effect. Alternatively, some coupling occurs during the blending of the first polymer and the coupling agent, but some of the coupling agent remains unreacted until the concentrate is blended into the propylene polymer composition.

The propylene polymer compositions of the present invention may further comprise an elastomer. Elastomers are defined as materials which experience large reversible deformations under relatively low stress. Elastomers are typically characterized as having structural irregularities, non-polar structures, or flexible units in the polymer chain. Preferably, an elastomeric polymer can be stretched to at least twice its relaxed length with stress and after release of the stress returns to approximately the original dimensions and shape. Some examples of commercially available elastomers include natural rubber, polyolefin elastomers (POE), chlorinated polyethylene (CPE), silicone rubber, styrenelbutadiene (SB) copolymers, styrene/butadiene/styrene (SBS) terpolymers, styrene/ethylene/butadiene/styrene (SEBS) terpolymers and hydrogenated SBS or SEBS.

Preferred elastomers are polyolefin elastomers. Suitable polyolefin elastomers for use in the present invention comprise one or more $C_2$ to $C_{20}$ alpha-olefins in polymerized form, having a glass transition temperature ($T_g$) less than 25° C., preferably less than 0° C. $T_g$ is the temperature or temperature range at which a polymeric material shows an abrupt change in its physical properties, including, for example, mechanical strength. $T_g$ can be determined by differential scanning calorimetry. Examples of the types of polymers from which the present polyolefin elastomers are selected include polyethylene and copolymers of alpha-olefins, such as ethylene and propylene (EPM), ethylene and 1-butene, ethylene and 1-hexene or ethylene and 1-octene, copolymers, and terpolymers of ethylene, propylene and a diene comonomer such as hexadiene or ethylidene norbomene (EPDM).

A preferred polyoletin.elastomer is one or more substantially linear ethylene polymer or one or more linear ethylene polymer (S/LEP), or a mixture of one or more of each. Both substantially linear ethylene polymers and linear ethylene polymers are well known. Substantially linear ethylene polymers and their method of preparation are fully described in U.S. Pat. No. 5,272,236 and U.S. Pat. No. 5,278,272 and linear ethylene polymers and their method of preparation are fully disclosed in U.S. Pat. No. 3,645,992; U.S. Pat. No. 4,937,299; U.S. Pat. No. 4,701,432; U.S. Pat. No. 4,937,301; U.S. Pat. No. 4,935,397; U.S. Pat. No. 5,055,438, EP 129,368; EP 260,999; and WO 90/07526 the disclosures of which are incorporated herein by reference.

If present, the elastomer is employed in amounts of equal to or greater than about 1 part by weight, preferably equal to or greater than about 5 parts by weight and most preferably equal to or greater than about 10 parts by weight based on the weight of the coupled propylene polymer composition. In general, the elastomer is used in amounts less than or equal to about 70 parts by weight, preferably less than or equal to about 50 parts by weight, more preferably less than or equal to about 30 parts by weight, even more preferably less than or equal to about 20 parts by weight and most preferably 15 parts by weight based on the weight of the coupled propylene polymer composition.

One or more additional thermoplastic polymer may be blended with the coupled propylene polymer provided the desired properties in the resulting coupled propylene polymer composition are achieved. Examples of additional thermoplastic polymers include any of the coupled or uncoupled propylene polymers described above for this invention; functionalized polypropylene, such as maleated polypropylene or polypropylene with carboxylic add moieties; polyethylene, such as high density polyethylene (HDPE), low density polyethylene (LDPE), linear low density polyethylene (LLDPE), ultra low density polyethylenes (ULDPE) and very low density polyethylene (VLDPE); interpolymers of ethylene with a vinyl aromatic, such as styrene; ethylene-vinyl acetate copolymer (EVA); ethylene-ethyl acetate copolymer (EEA); ethylene acrylic acid (EAA); polystyrene; polycydohexylethane; polyesters, such as polyethylene terephthalate; syndiotactic polypropylene; syndiotactic polystyrene; polyamides; and mixtures thereof.

If present, the additional thermoplastic polymer is employed in amounts equal to or greater than about 1 part by weight, preferably equal to or greater than about 5 parts by weight and most preferably equal to or greater than about 10 parts by weight based on the weight of the coupled propylene polymer composition. In general, the additional polymer is used in amounts less than or equal to about 70 parts by weight, preferably less than or equal to about 50 parts by weight, more preferably less than or equal to about 30 parts by weight, even more preferably less than or equal to about 20 parts by weight and most preferably 15 parts by weight based on the weight of the coupled propylene polymer composition.

Optionally, the propylene polymer compositions of the present invention may further comprise mineral fillers such as calcium carbonate, talc, clay, mica, wollastonite, hollow glass beads, titaninum oxide, silica, carbon black, glass fiber or potassium titanate. Preferred filters are talc, wollastonite, clay, cation exchanging layered silicate material or mixtures thereof. Talcs, wollastonites, and clays are generally known fillers for various polymeric resins. See for example U.S. Pat. No. 5,091,461 and 3,424,703; EP 639,613 A1; and EP 391,413, where these materials and their suitability as filler for polymeric resins are generally described. The mineral fillers can be calcined, uncalcined or mixtures thereof. See for example U.S. Pat. No. 6,403,692 the disclosure of which is incorporated herein by reference.

Examples of preferred cation exchanging layered silicate materials, sometimes referred to as nanofillers, include biophilite, kaolinite, dickalite or talc clays; smectite clays; vermiculite clays; mica; brittle mica; fluoromica; Sepiolite; Magadiite; Kenyaite; Octosilicate; Kanemite; and Makatite. Preferred cation exchanging layered silicate materials are smectite clays, including montmorillonite, bidelite, saponite and hectorite.

The amount of filler will depend on the filler, the propylene polymer and the application, but usually, the filler is employed in an amount equal to or greater than about 0.1 parts by weight, preferably equal to or greater than about 1 part by weight, more preferably equal to or greater than about 5 parts by weight, even more preferably equal to or greater than about 10 parts by weight, and most preferably equal to or greater than about 15 parts by weight based on the total weight of the coupled propylene polymer composition. Usually it has been found sufficient to employ an amount of filler equal to or less than about 60 parts by weight, preferably equal to or less then about 50 parts by weight, more preferably equal to or less than about 40 parts by weight, more preferably equal to or less than about 30 parts by weight and most preferably up to and including about 25 parts by weight based the weight of the coupled propylene polymer composition.

The compositions of the present invention can comprise a slip agent. Preferred slip agents are a saturated fatty acid amide or ethylenebis(amide), an unsaturated fatty acid amide or ethylenebis(amide) or combinations thereof. The saturated fatty amides useful in the present invention conform essentially to the empirical formula $RC(O)NHR^1$ where R is a saturated alkyl group having of from 10 carbon atoms to 26 carbon atoms and $R^1$ is independently hydrogen or a saturated alkyl group having of from 10 carbon atoms to 26 carbon atoms. Compounds which conform to the above empirical structure are for example, palmitamide, stearamide, arachidamide, behenamide, stearyl stearamide, palmityl pamitamide, stearyl arachidamide and mixtures thereof.

The saturated ethylenebis(amides) useful in the present invention conform essentially to the empirical formula $RC(O)NHCH_2CH_2NHC(O)R$ where R is as defined previously. Compounds which conform to the above empirical structure are for example, stearamidoethylstearamide, stearamidoethylpalmitamide, palmitamido-ethylstearamide and mixtures thereof.

The unsaturated fatty amides useful in the present invention conform essentially to the empirical formula $R^2C(O)NHR^3$ where $R^2$ is an unsaturated alkyl group having of from 10 carbon atoms to 26 carbon atoms and $R^3$ is independently hydrogen or a unsaturated alkyl group having of from 10 carbon atoms to 26 carbon atoms. Compounds which conform to the above empirical structure are for example, oleamide, erucamide, linoleamide, and mixtures thereof.

The unsaturated ethylenebis(amides) useful in the present invention conform essentially to the empirical formula $R^4C(O)NHCH_2CH_2NHC(O)R^4$ where $R^4$ is either a saturated or unsaturated alkyl group having of from 10 carbon atoms to 26 carbon atoms with the proviso that at least one of $R^4$ is unsaturated. Compounds which conform to the above empirical structure include, erucamidoethylerucamide, oleamidoethyloleame, erucamidoethyloleamide, oleamidoethylerucamide, stearamidoethylerucamide, erucamidoethylpalmitamide, palmitamidoethytoleamide and mixtures thereof.

Generally preferred concentrations of the saturated fatty acid amide or ethylene-bis(amide) are in the range of from about 0 parts to about 0.5 parts by weight, preferably of from about 0.025 parts to about 0.25 parts by weight and most preferably of from about 0.05 parts to about 0.15 parts by weight based on the weight of the total composition. Generally, preferred concentrations of the unsaturated fatty acid amide or ethylenebis(amide) are in the range of from about 0 parts to about 1 parts by weight, preferably of from about 0.05 parts to about 0.75 parts by weight and most preferably of from about 0.1 parts to about 0.3 parts by weight based on the weight of the total composition.

Additionally, it is believed that in some instances nucleating agents and/or clarifying agents may preferably be utilized with the practice of the invention. Examples of nucleating agents include metal salts of an aromatic or aliphatic carboxylic acid, such as aluminum benzoate, sodium benzoate, aluminum p-t-butylbenzoate, sodium adipate, sodium thiophenecarboxytate and sodium pyrrolecarboxylate. Metal salts of an organic phosphoric acid are also preferred as the nucleating agent. Additional nucleating agents and their use are fully described in U.S. Pat. No. 6,153,715 which is incorporated herein by reference. Effective amounts are known in the art and depend on parameters of the composition and conditions to which they are exposed.

Various additives are optionally incorporated in the coupled propylene polymer composition such as, pigments, antioxidants, acid scavengers, ultraviolet absorbers, neutralizers, antiblock agents, antistatic agents, clarifiers, waxes, flame retardants, processing aids, extrusion aids, and other additives within the skill in the art used in combination or alone. Effective amounts are known in the art and depend on parameters of the composition and conditions to which they are exposed.

Preparation of the coupled propylene polymer compositions of this invention can be accomplished by any suitable mixing means known in the art, including dry blending the individual components and subsequently melt mixing, either directly in the injection molding machine used to make the automotive article, premixing the individual components in a separate extruder (e.g., a Banbury mixer, a single screw extruder, a twin screw extruder, et;), extruding, pelletizing, then injection molding the resultant pellets into an automotive article or a combination thereof wherein some components are pre-mixed in a separate extruder and dry blended with additional components directly in the injection molding machine to form the automotive article.

The coupled propylene polymer compositions of the present invention are thermoplastic. When softened or melted by the application of heat, the coupled propylene polymer compositions of this invention can be formed or molded using conventional techniques such as injection molding. Injection molding processes are well known in the art and commercially practiced for production of a broad range of molded parts. As is known, injection molding processes typically include the steps of extruding or plasticating the resin under shearing and/or heating to provide a flowable resin, injection of the heat plastitied flowable resin into the mold through a runner, applying additional pressure to pack the resin into the mold and cooling the molded parts to solidify the part enough to remove from the mold.

It has been found that the process for preparing injection molded automotive articles according to the present invention and the resulting parts are surprisingly improved by the use of the describe coupled propylene polymer composition. Preferable automotive articles include exterior and interior automotive trims, seat backs, head rests, glove box doors, center consoles, intake manifolds, bumper beams, bumper fascia, pillars, instrument panels, spoilers, door trim, side moldings, HVAC ducts, spare tire covers, fluid reservoirs, rear window shelves, resonators, trunk boards, arm rests, airbag covers, mats, weather stripping, window seals, shift lever knobs, interior skins, and soft tough over-moldings.

To illustrate the practice of this invention, examples of the preferred embodiments are set forth below. However, these examples do not in any manner restrict the scope of this invention.

EXAMPLES

The compositions of Comparative Example A and Examples 1 and 2 are dry blended and compounded in a co-rotating twin screw extruder. The barrel temperature profile is from 200° C. to 200° C. The extrudate was cooled in the form of strands and comminuted as pellets. The pellets are used to prepare test specimens in a KraussMaffei KM 250-1650B injection molding machine. Plaques measuring 14 centimeter (cm) by 23 cm with coarse and shallow grain are molded with barrel temperatures of 200° C., 210° C., 220° C., 230° C., and 230° C. and a mold temperature of 25° C. Injection pressure is 65 bar giving an injection time of 3 seconds and holding pressure is 50 bar for 20 seconds. Smaller lab specimens for standard ISO testing are made on a DEMAG 80–200 under similar conditions.

The formulation content of Comparative Example A and Examples 1 and 2 are given in Table 1 below in parts by weight based on the weight of the total composition. In Table 1:

"PP" is a polypropylene impact copolymer available as DOW C705–44NA HP Polypropylene Resin available from The Dow Chemical Company having a density of 0.9 g/cm$^3$, a melt flow rate of 44 g/10 min. at 230° C. and an applied bad of 2.16 kg;

"SLEP" is a substantially linear ethylene/octene copolymer available as AFFINITY™ EG8200 from The Dow Chemical Company having a density of 0.868 g/cm$^3$, a melt flow rate of 5 g/10 min. determined at 190° C. and an applied load of 2.16 kg;

"HDPE" is a high density polyethylene available as HDPE 96003E from The Dow Chemical Company having a density of 0.960 g/cm$^3$ and a melt flow rate of 1 g/10 min. determined at 190° C. and an applied load of 2.16 kg;

"BSA" is a mixture of 25 weight percent 4, 4'-diphenyl ether bis(sulfonyl azide) and 75 weight percent IRGANOX™ 1010 brand antioxidant which is a hindered polyphenol stabilizer tetrakis [methylene 3-(3,5-ditert.butyl-4-hydroxy-phenylpropionate) ]methane available form Ciba-Geigy Corporation;

"TALC" is a commercially available mineral talc available as Hipro Compacted Ultra 5C from Hipro Trading having a median particle size of 0.5 microns and a maximum particle size of 2 microns;

"Erucamide" is an unsaturated fatty amide with the formula $C_{21}H_{41}CONH_2$ available as ARMOSLIP™ from AKZO Nobel:

"CHIMASSORB™ 119" is a UV stabilizer available from Ciba-Geigy Corporation;

"IRGANOX B 215" is an antioxidant available from Ciba Geigy is a 1:2 mixture of 3,5-bis(1,1-dimethylethyl)-4-hydroxy-2,2-bis[3-[3,5-bis(1,1-dimethylethyl)-4-hydroxyphenyl] oxo-propoxy]methyl-1, 3propanediyl ester with tris(2,4-di-tert-butylphenyl phosphite; and "Plasblack 4045" is a black polypropylene concentrate available from Cabot.

The following tests are run on Examples 1 to 2 and the results of these tests are shown in Table 1:

"Density" is measured according to ISO 1183 method A;

"MFR" melt flow rate is determined according to ISO 1133 on a Zwick 4106 plastometer at 230° C. and an applied load of 2.16 kg;

"Flexural Modulus" is determined in accordance with ISO 178. Testing is performed using an instron mechanical tester at a rate of 2 millimeter per minute (mm/min.);

"Tensile Properties" are done in accordance with ISO 527. Testing is performed using an instron mechanical tester at 50 mm per minute (mm/min);

"Notched Izod" is determined according to ISO 180/A1 at 23 ° C. Specimens are cut from rectangular HDT bars and measured 4 mm in thickness. The specimens are notched with a notcher to give a 250 micron radius notch. A Zwick Izod impact testing unit is used;

"Heat Deflection Temperature" is determined at 0.45 MPa and/or 1.82 MPa according to ISO 75A using a Ceast heat deflection temperature apparatus;

"Ash" is determined by thermal gravimetric analysis using DuPont DSC apparatus;

"shore D Hardness" hardness is measured according to ISO 868;

"Gloss 60" is 60 degree gloss determined on a coarse grain textured plaque according to ISO 2813 on a Dr. Lange reflectometer;

"Scratch Resistance" is determined according to standard GME 60280 from GM where 1 mm styles are applied at a force of 5 to 20 Newtons (N) at a speed of 1200 mm/min. to get cross hatch of scratches. The delta L (DL) is measured before and after scratching with a Data Color International DC3890 spectrophotometer.

Example 3 is an injection molded automotive doorpocket molded from the propylene composition of Example 1. Comparative Example B is an injection molded automotive doorpocket molded from the propylene composition of Comparative Example A. The doorpocket measures 105 by 26 by 8 cm having a thickness of 3 mm and a weight of 925 grams. It is molded on a 1000 ton Krauss-Maffei injection molding machine. The melt temperature is 220° C. the injection pressure is 70 bar and the cycle time is 45 seconds. The doorpocket of Example 3 has a DL of 0.25 according to scratch test GME 60280 at 5N. The doorpocket of Comparative Example B has a DL of 0.85 according to scratch test GME 60280 at 5N.

Example 4 is an injection molded. B-pillar molded from the propylene composition of Example 1. Comparative Example C is an injection molded B-pillar molded from the propylene composition of Comparative Example A. The B-pillar measures 65 by 8 by 4 cm with a thickness of 2.5 mm and weighs 355 grams. It is molded on a 500 ton Krauss-Maffei injection molding machine. The melt temperature is 230° C., the injection pressure is 80 bar and the cycle time is 55 seconds. The B-pillar of Example 4 has a DL of 0.35 according to scratch test GME 60280 at 5N. The B-pillar of Comparative Example C has a DL of 0.65 according to scratch test GME 60280 at 5N.

TABLE 1

|  | COMPARATIVE EXAMPLE | EXAMPLE | |
| --- | --- | --- | --- |
|  | A | 1 | 2 |
| COMPONENT |  |  |  |
| PP | 63.3 | 62.8 | 62.3 |
| Talc | 15 | 15 | 15 |
| SLEP | 10 | 10 | 10 |
| HDPE | 5 | 5 | 5 |
| BSA | 0 | 0.5 | 1 |
| Plasblack 4045 | 6 | 6 | 6 |
| CHIMASSORB 119 | 0.2 | 0.2 | 0.2 |
| IRGANOX B215 | 0.3 | 0.3 | 0.3 |
| Erucamide | 0.2 | 0.2 | 0.2 |
| PROPERTIES |  |  |  |
| Density, g/ml | 1.02 | 1.02 | 1.02 |
| MFR @ 230° C./2.16 kg, g/10 min. | 25.5 | 9.5 | 1.0 |
| Flexural Modulus, MPa | 1812 | 1846 | 1780 |

TABLE 1-continued

| | COMPARATIVE EXAMPLE | EXAMPLE | |
|---|---|---|---|
| | A | 1 | 2 |
| Tensile Properties | | | |
| Strength at Yield, MPa | 22.2 | 22.2 | 24.6 |
| Strength at Break, MPa | 13.3 | 15.4 | 19.5 |
| Elongation at Yield, % | 5 | 5 | 8.25 |
| Elongation at Break, % | 26 | 40 | 31 |
| Modulus, MPa | 1832 | 1855 | 1863 |
| Notch Izod, kJ/m$^2$ at 23° C. | 28 | 41 | 31 |
| Heat deflection temperature, ° C. | | | |
| 0.45 MPa | 110 | 89 | 104 |
| 1.82 MPa | 58 | 52 | 53 |
| Ash, percent | 16.2 | 16.5 | 15.8 |
| Shore D Hardness | 65.3 | 65.2 | 64.9 |
| Gloss 60 | 1.2 | 1.2 | 1.2 |
| Scratch resistance GME 60280 | | | |
| 5 N | 0.901 | 0.294 | 0.68 |
| 10 N | 1.111 | 0.338 | — |
| 15 N | 2.105 | 0.558 | — |
| 20 N | 3.548 | 1.309 | — |

From these data, it can be concluded that the process of the present invention provides molded propylene polymer articles having an excellent combination of physical, mechanical, thermal and scratch and mar resistant properties.

What is claimed is:

1. A process for preparing an injection molding automotive article from a coupled propylene polymer composition comprising the steps of:
   i preparing a coupled propylene polymer composition comprising:
      (a) a propylene polymer formed by a reaction of from about 0.01 to 1.0 weight percent of a poly(sulfonyl azide) with a propylene polymer, wherein weight percent is based on the weight of the propylene polymer, and optionally one or more of
      (b) a polyolefin elastomer,
      (c) a thermoplastic polymer
      (d) a filler or
      (e) a slip agent, and
   ii injection molding an automotive article.

2. The process of claim 1 wherein the propylene polymer is an impact propylene copolymer.

3. The process of claim 1 wherein the poly(sulfonyl)azide is 4,4'-diphenyl ether bis(sulfonyl azide).

4. The process of claim 1 wherein the poly(sulfonyl)azide is added as a dry mixture of 4,4'-diphenyl ether bis(sulfonyl azide) and tetrakis methane optionally blended with a linear propylene homopolymer polymer powder.

5. The process of claim 1 wherein the poly(sulfonyl)azide is added as a melt blended mixture of 4,4'-diphenyl ether bis(sulfonyl azide) and tetrakis methane with a linear propylene homopolymer.

6. The process of claim 1 wherein the coupled propylene polymer composition comprises from about 1 to about 70 weight percent of a polyolefin elastomer, wherein weight percent is based on the weight of the propylene polymer composition.

7. The process of claim 6 wherein the polyolefin elastomer is a substantially linear ethylene polymer or a linear ethylene polymer.

8. The process of claim 1 wherein the coupled propylene polymer composition comprises from about 1 to about 70 weight percent of a thermoplastic polymer, wherein weight percent is based on the weight of the propylene polymer composition.

9. The process of claim 8 wherein the thermoplastic polymer is linear low density polyethylene, low density polyethylene or high density polyethylene.

10. The process of claim 1 wherein the coupled propylene polymer composition comprises from about 1 to about 60 weight percent of a filler, wherein weight percent is based on the weight of the propylene polymer composition.

11. The process of claim 10 wherein the filler is a calcined talc, an uncalcined talc or mixture thereof.

12. The process of claim 1 wherein the coupled propylene polymer composition comprises up to about 1 weight percent of a slip agent, wherein weight percent is based on the weight of the propylene polymer composition.

13. The process of claim 12 wherein the slip agent is erucamide.

14. A process for preparing an injection molding automotive article from a coupled propylene polymer composition comprising the steps of:
   i preparing a coupled propylene polymer composition comprising:
      (a) from about 30 to about 80 weight percent of a propylene polymer formed by a reaction of from about 0.1 to about 0.6 weight percent based on the weight of the propylene polymer of 4,4'-diphenyl ether bis(sulfonyl azide) with a propylene polymer,
      (b) from about 5 to about 20 weight percent of a substantially linear ethylene polymer or linear ethylene polymer,
      (c) from about 5 to about 20 weight percent of linear low density polyethylene or high density polyethylene
      (d) from about 10 to about 30 weight percent of calcined talc, uncalcined talc or mixture thereof and
      (e) from 0 to about 1 weight percent of erucamide, wherein weight percents for (b), (c), (d) and (e) are based on the weight of the coupled propylene polymer composition and
   ii injection molding an automotive article.

15. The process of claim 1 wherein the propylene polymer coupling reaction takes place in the same injection molding machine that produces the injection molded automotive article.

16. The process of claim 1 wherein the article is a seat back, a head rest, a knee bolster, glove box door, an instrument panel, a bumper facia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board, airbag covers, mats, weather stripping, window seals, shift lever knobs, interior skins, and soft tough overmoldings or an arm rest.

* * * * *